UNITED STATES PATENT OFFICE.

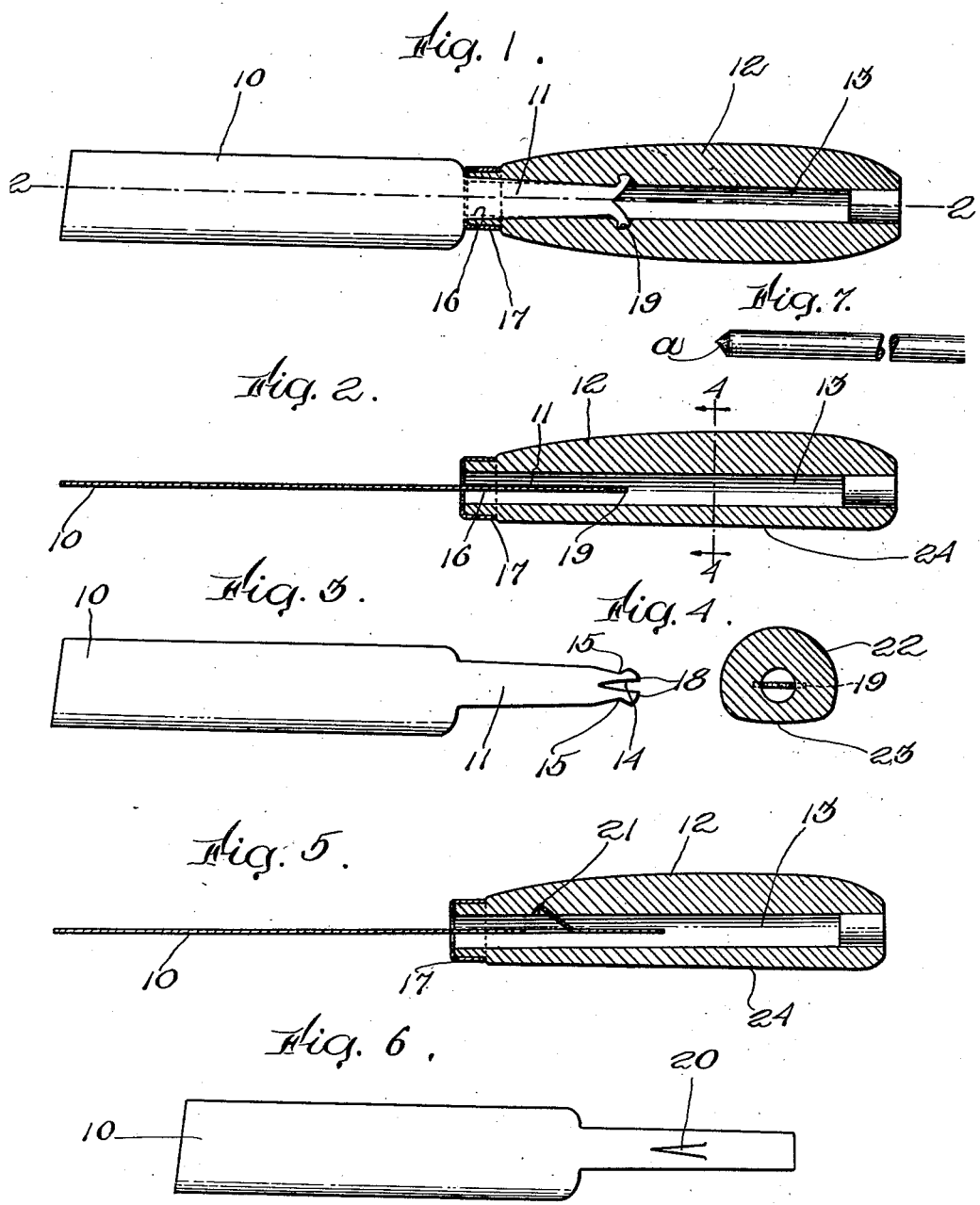

GEORGE W. GOULD, OF NEW DURHAM, NEW HAMPSHIRE, ASSIGNOR TO ARTHUR C. LEWIS, GEORGE W. GOULD, AND WALLACE C. WRIGHT, PARTNERS DOING BUSINESS UNDER THE FIRM-NAME OF G. W. GOULD KNIFE MANUFACTURING COMPANY, OF LYNN, MASSACHUSETTS.

SHOE-KNIFE.

1,064,206.  Specification of Letters Patent.  Patented June 10, 1913.

Application filed July 19, 1912. Serial No. 710,439.

*To all whom it may concern:*

Be it known that I, GEORGE W. GOULD, a citizen of the United States, and resident of New Durham, in the county of Strafford and State of New Hampshire, have invented an Improvement in Shoe-Knives, of which the following description, in connection with the accompanying drawings, is a specification, like letters on the drawings representing like parts.

My present invention relates to knives, particularly shoe knives, and the invention has to do more especially with an improved construction of blade-tang and handle and with improved means for securely and reliably fixing the blade to the handle with the blade-tang held by the handle in a manner to preclude any possibility of loosening or casual displacement thereof.

The invention will be better understood from the following detailed description, taken in connection with the accompanying drawings, and will be thereafter pointed out in the appended claims.

Referring to the drawings, Figure 1 is an elevation of a shoe-knife formed in accordance with one embodiment of my invention, the handle being shown in section; Fig. 2 is a sectional view on line 2—2 of Fig. 1; Fig. 3 is an elevation of the blade in this embodiment of the invention, showing the tang before it is interengaged with the handle; Fig. 4 is a transverse section on line 4—4 of Fig. 2; Fig. 5 is a sectional view similar to Fig. 2 showing another embodiment of the invention; Fig. 6 is an elevation showing the blade of this form of the invention; and Fig. 7 shows a tool which may be employed.

The blade 10 may be an ordinary form common in shoe knives or any desired form, having a tang 11, shown as tapered, formed therewith, preferably from plate stock of the proper thickness. The handle 12 has a hole 13 of uniform size lengthwise, bored or otherwise formed lengthwise thereof and of slightly less diameter than that of the widest portion of the tang next to the blade proper. In the form of the invention shown in Figs. 1 to 4, the end of the tang has a short V-slot 14 formed therein, and the sides of the tang adjacent the slot are cut away a short distance back from the tang end as seen at 15, so that the tang prongs formed by the slot 15 will bend at this point upon the application of wedging pressure and the extremities of the prongs form enlarged heads and, when bent as in Fig. 1, present forward edges at substantially right angles to the length of the hole 13 or walls thereof. The tang thus formed is inserted in the hole 13 of the handle and forced home, the inner end of the tang biting into the wood at the inner end of the handle somewhat, as indicated by the dotted lines at 16 in Fig. 1, a suitable ferrule or thimble 17 being shown as applied to the reduced inner end of the handle to strengthen and protect the same. The prong portions or spurs 18 at the end of the tang are then spread apart by a suitable tool, shown at $a$, with a wedging end, and by this means the prongs or spurs 18 are forced into the wood of the handle at either side to some little distance, as seen at 19, and firmly embedded therein, so that they extend rigidly and unyieldingly almost straight across the whole end of the tang. The tang is not split up from its end appreciably, but is whole and strong and stocky, so as to be able to withstand strongly all twisting and prying strains on the blade. The prong portions 18 of the tang are bent laterally as far as is feasible without running the risk of injuring the metal, thereby making the end of the tang practically T-shaped as distinguished, for instance, from having the tang split for a substantial extent of its length as viewed in Fig. 1, which would simply provide two long separated and therefore more or less yielding legs or slender yielding portions. But by having the body of the tang whole, i. e., uncut throughout its entire width and from the blade end to the deflected T-head or spurs 19, I secure great strength and stability as well as a less expensive and more easily applied and secure construction. The tang is thus firmly and strongly assembled with the handle, and liability of loosening and displacement in use is entirely eliminated, this desirable result being accomplished without the use of any additional parts whatsoever or any weakening, either of the handle or the blade and its tang.

In Figs. 5 and 6 I show a modified form of the invention having, in common with the just described form, a portion of the blade tang struck out and displaced, to be pressed into the wood of the handle, but in this form, instead of having the end of the tang forked, I strike out a prong or spur 20, preferably pointed, from an intermediate portion of the tang, with its free end pointed toward the blade, and, after the insertion of the tang in the handle in like manner as in the other form, this spur is, by a suitable tool, forced out so as to be embedded in the wood of the handle as seen at 21. It will be evident that the tang will be firmly held against displacement by this prong, since the tang is held gripped at its sides in the wood of the stock, which prevents lateral displacement in the handle, and the prong or spur 20 sticks into the wood in a direction to at once and strongly resist any tendency toward endwise movement of the tang.

It will be observed that both forms of the invention can be produced at very small cost, the special form of tang in either embodiment of the invention being died or stamped out with practically no extra trouble or cost over that required for the usual form, while the subsequent operation required for spreading the pronged ends in the one form or for pressing outward the lateral prong in the other form is one almost instantly carried out and requiring no specially skilled labor, so that a knife of which the blade can be depended upon to remain seated and rigid in its handle can be produced at practically no additional cost over the knives heretofore in use with their objectionable liability of the dropping out of the blade. A further objection noted in the use of ordinary shoe knives is their constant liability to roll off from tables and other surfaces where they are laid down, by reason of their round handles. To obviate this objection, I form my improved knife with a handle round as usual at one side, as seen at 22, but flattened or formed on a very flat convex curve, as seen at 23, on the other side. This construction I have found to fit the hand of the user quite as well or better than one circular in cross section, and it has the important advantage of lying where placed, since, as soon as the flat side 23 comes to rest on the table, the knife will stop its rolling motion and remain where placed. To best effect this result, it is important that the flat side of the handle be in general parallelism with the flat side of the blade, as seen at 24. This flat side is not only parallel to the blade but is always on that side of the handle which will cause the knife, when it is thrown down on the bench by the operator and rolls over to a position of rest, always to halt in such a position that the sharp edge will invariably lie in the same direction, so that when the operator grabs the knife again its sharp edge extends in that direction required by him for instant use in his work. In other words, as the handle has one round side and one flat side and the sharp edge always extends in the same direction with relation to these two sides, the knife will roll onto that one flat side always, and hence when the operator grabs it up he does not have to look at the knife to see how he grabbed it because the sharp edge invariably points in one and the same direction with reference to said flat side. An operator soon learns to drop his knife with a slight rolling impulse so as to insure this self-positioning, due to said single flat side.

Having described my invention, what I claim as new and desire to secure by Letters Patent is:

1. A shoe knife, comprising a blade having a tang provided with a laterally projecting spur sufficiently stiff to hold the blade rigid in use but sufficiently yielding and flexible to be capable of being bent and driven into the handle from within the bore of the latter when the blade and its tang are in place, and a handle having a longitudinal bore, and said bore having a size, extent and location which provide a space around the tang, so positioned, sufficient to receive a tool inserted into said bore and to permit said spur to be laterally bent thereby and driven into the adjacent wall of said bore into rigid blade-holding position.

2. A shoe knife, comprising a handle having a longitudinal bore thereinto and flattened on one side so as to leave the wood relatively thin between the bore and said flat side and relatively thick about the remaining circumferential portion of said bore, and a blade provided with a flat tang in the same plane as the external portion of the blade, said bore being of such size as to allow the tang to be driven into it with a driving fit, the tang being positioned parallel to said flat side of the handle so as to have the tang-edges drive into the relatively thick portions of the handle, said tang also having a spur sufficiently stiff to maintain the blade immovable in the handle in use but being sufficiently bendable to be capable of being driven into the wall of the bore from within the latter in the manufacture of the handle, said spur extending into said relatively thick portion of the handle, and said bore opening freely at one end of the handle with a relatively large space from said end to the spur, said large space having a size and position capable of receiving a tool, when the tang is in place, for so bending and driving said spur into the adjacent thick wall of said bore.

In testimony whereof, I have signed my name to this specification, in the presence of two subscribing witnesses.

GEORGE W. GOULD.

Witnesses:
CHARLES L. HOLMES,
FORREST B. WEDGWOOD.